US012281609B2

(12) United States Patent
Tissot et al.

(10) Patent No.: US 12,281,609 B2
(45) Date of Patent: Apr. 22, 2025

(54) TURBOCHARGED ENGINE SYSTEM AND METHOD OF CHARGING AND EMISSION CONTROLLING A TURBOCHARGED ENGINE SYSTEM

(71) Applicant: Accelleron Switzerland Ltd., Baden (CH)

(72) Inventors: Jean-Francois Tissot, Bergheim (FR); Cyril Bessonnard, Zürich (CH)

(73) Assignee: Accelleron Switzerland Ltd., Baden (CH)

( * ) Notice: Subject to any disclaimer, the term of this patent is extended or adjusted under 35 U.S.C. 154(b) by 0 days.

(21) Appl. No.: 18/710,572

(22) PCT Filed: Nov. 10, 2022

(86) PCT No.: PCT/EP2022/081504
§ 371 (c)(1),
(2) Date: May 15, 2024

(87) PCT Pub. No.: WO2023/088784
PCT Pub. Date: May 25, 2023

(65) Prior Publication Data
US 2025/0035032 A1    Jan. 30, 2025

(30) Foreign Application Priority Data
Nov. 19, 2021  (EP) .................................... 21209307

(51) Int. Cl.
*F02B 37/12*    (2006.01)
*F02B 37/10*    (2006.01)
*F02B 39/10*    (2006.01)

(52) U.S. Cl.
CPC .............. *F02B 37/12* (2013.01); *F02B 37/10* (2013.01); *F02B 39/10* (2013.01)

(58) Field of Classification Search
CPC ........... F02B 37/10; F02B 37/12; F02B 39/10
See application file for complete search history.

(56) References Cited

U.S. PATENT DOCUMENTS

| 2016/0153350 A1 | 6/2016 | Pappenseimer et al. |
| 2019/0003374 A1 | 1/2019 | Wetss |
| 2020/0325817 A1 | 10/2020 | Heinken |

FOREIGN PATENT DOCUMENTS

| CN | 109424426 A * | 3/2019 | .............. F02B 37/16 |
| DE | 10332043 B4 * | 4/2007 | .............. F02B 37/10 |

(Continued)

OTHER PUBLICATIONS

International Search Report and Written Opinion in Application No. PCT/EP2022/081504, mailed Mar. 7, 2023, 14 pages.

(Continued)

*Primary Examiner* — Ngoc T Nguyen
(74) *Attorney, Agent, or Firm* — Meunier Carlin & Curfman LLC

(57) ABSTRACT

A turbocharged engine system is described comprising a combustion engine having at least one cylinder, at least one inlet valve configured to supply the at least one cylinder with intake air, and at least one outlet valve configured to discharge exhaust from the at least one cylinder. The at least one inlet valve is configured to provide constant Miller timing or constant Atkinson timing. Additionally, the turbocharged engine system comprises at least one turbocharger having a turbine and a compressor for pressurizing the intake air, at least one electrical power converter coupled with at least one of the compressor and the turbine, and a control device configured for controlling the at least one electrical power converter to provide power to or to take off power from at least one of the compressor and the turbine to achieve a targeted value of at least one operational parameter of the combustion engine.

18 Claims, 2 Drawing Sheets

(56) References Cited

FOREIGN PATENT DOCUMENTS

| | | |
|---|---|---|
| JP | 2006-242029 A | 9/2006 |
| JP | 2013-532790 A | 8/2013 |
| JP | 2016094828 A | 5/2016 |

OTHER PUBLICATIONS

Extended European Search Report in Application No. 21209307.4, dated May 17, 2022, 8 pages.

\* cited by examiner

TURBOCHARGED ENGINE SYSTEM AND METHOD OF CHARGING AND EMISSION CONTROLLING A TURBOCHARGED ENGINE SYSTEM

TECHNICAL FIELD

Embodiments of the present disclosure relate to turbocharged engine systems. Further embodiments of the present disclosure relate to methods of charging and emission controlling turbocharged engine systems.

BACKGROUND

One of the most important pollutant of internal combustion engines is the $NO_x$ (nitrogen oxide). This pollutant forms at high temperature and when $O_2$ is in excess, which goes generally with good engine efficiency. Thus, reducing $NO_x$ leads generally to efficiency degradation. In other words, the lower the $NO_x$ emissions, the lower the efficiency. Conventional measures to reduce the $NO_x$ after the engine outlet called Exhaust After Treatment (EAT) are complex, bulky and expensive.

Several solutions already exist for lowering the raw $NO_x$ emissions, e.g. at the engine outlet, and before the optional EAT system. An exemplary solution is Exhaust Gas Recirculation (EGR), which consists in recirculating a fraction of the exhaust gases toward the intake. The purpose is to admit inert gases ($CO_2$) with air into the cylinders, in a way to reduce the maximal cycle temperature during the combustion (slower combustion and thermal capacity effect). This technology leads to aging problems and can strongly reduce the engine efficiency. For lean burn gas engines, EGR can also reduce the amount of air, and thus the excess of Oz, at given load, and therefore reduces the amount of possible $NO_x$ emissions.

Another solution is water injection in the intake or directly in the cylinders (mostly the same idea as for EGR, but with $H_2O$ instead of $CO_2$). This technology requires additional tank, pump(s) and circuit, and often gives a mitigated [$NO_x$; efficiency] trade-off.

Yet another solution is employing a Miller or Atkinson valve timing combined with high performance super charging or turbocharging system. Here, the idea is to artificially short down the intake phase by closing the intake valve while the piston is still breathing (Miller), or to artificially short down the compression stroke, by closing the intake valve while the piston has already started moving upwards (Atkinson), and by simultaneously compensating the lack of air mass by further increasing the boost pressure. Thus, thanks to the higher fraction of the global compression built by super or turbocharging with aftercooler (instead of being carried out by the piston), the temperature at the end of the cylinder compression stroke is lower, leading to a decrease of the maximal combustion temperature and consequently, to a reduced $NO_x$ formation.

Currently, for increasing efficiency with reduced $NO_x$ emissions a part of the internal combustion engines is equipped with systems enabling operation with Miller timings. With such systems the intake valves are closed quite early during the intake stroke, thus strongly reducing the cylinders air breathing (volumetric efficiency). In order to maintain the required air mass flow of the engine, a turbocharger is employed for compensating the lack of breathing by providing higher pressure ratio (higher intake receiver density). Often, one more compression stage must be added, leading switching from one-stage to two-stage turbocharging architecture.

However, the compensation of the above-described lack of engine breathing by the turbocharging system can only be effective once the energy within the exhaust gases at the inlet of the turbocharger(s) turbine(s) is sufficient, which is almost always not the case at low engine speed and/or load. In other words, it is quite never possible to keep the Miller timing at low engine speed and/or load because the turbocharging system is not able to compensate the lack of volumetric efficiency as it can do at full engine power. Keeping a Miller timing at low engine speed could also be a problem for starting the engine. Exactly the same difficulties can be faced with a constant Atkinson timing.

In order to solve this problem, the current state of art teaches to employ a variable intake valve train configured for switching from a Miller timing at high speed and/or load to a non-Miller timing at low speed and/or load. However, variable intake valve train systems have the disadvantage that they are rather complex and expensive. This statement is also valid for an Atkinson timing.

Accordingly, in view of the above, there is a demand for improved turbocharged engine systems and improved methods of charging and emission controlling turbocharged engine systems which at least partially overcome some of the problems of the state of the art.

SUMMARY

In light of the above, a turbocharged engine system and a method of charging and emission controlling a turbocharged engine system according to the independent claims are provided. Further, a method of controlling operation and a use of a turbocharging assembly according to embodiments described herein are described. Further aspects, advantages, and features are apparent from the dependent claims, the description, and the accompanying drawings.

According to an aspect of the present disclosure, a turbocharged engine system is provided. The turbocharged engine system comprises a combustion engine having at least one cylinder. Further, the turbocharged engine system comprises at least one inlet valve configured to supply the at least one cylinder with intake air or air-fuel-mixture and at least one outlet valve configured to discharge exhaust from the at least one cylinder. The at least one inlet valve is configured to provide a constant cyclical valve timing between an open state and a closed state of the at least one inlet valve. The constant cyclical valve timing is a Miller timing or Atkinson timing. Additionally, the turbocharged engine system comprises at least one turbocharger having a turbine and a compressor for pressurizing the intake air or air-fuel-mixture. Further, the turbocharged engine system comprises at least one electrical power converter coupled with at least one of the compressor and the turbine. Moreover, the turbocharged engine system comprises a control device configured for controlling the at least one electrical power converter to provide power to or to take off power from at least one of the compressor and the turbine to achieve a targeted value of at least one operational parameter of the combustion engine. The turbine has an effective section $S_{res,T}$ being sized such that a generated power by the turbine provides at least a power required by the compressor to reach the targeted value of the at least one operational parameter without using the at least one electrical power converter as a motor during non-acceleration operation of the combustion engine.

According to a further aspect of the present disclosure, a method of charging and emission controlling a turbocharged engine system is provided. The turbocharged engine system comprises a combustion engine having at least one cylinder, at least one inlet valve configured to supply the at least one cylinder with intake air or air-fuel-mixture, at least one outlet valve configured to discharge exhaust from the at least one cylinder, at least one turbocharger having a turbine and a compressor for pressurizing the intake air or air-fuel-mixture, at least one electrical power converter coupled with at least one of the compressor and the turbine, a control device configured for controlling the electrical power converter. The turbine has an effective section $S_{res,T}$ being sized such that a generated power by the turbine provides at least a power required by the compressor to reach the targeted value of the at least one operational parameter without using the at least one electrical power converter as a motor during non-acceleration operation of the combustion engine. The method comprises providing a constant cyclical valve timing between an open state and a closed state of the at least one inlet valve. The constant cyclical valve timing is a Miller timing or Atkinson timing. Further, the method comprises controlling the at least one electrical power converter by the control device for providing power to at least one of the compressor and the turbine only during acceleration modes of the combustion engine. Alternatively, or additionally, method comprises controlling the at least one electrical power converter by the control device for taking power off from at least one of the compressor and the turbine only during non-acceleration modes to achieve the targeted value of at least one operational parameter of the combustion engine.

Accordingly, compared to the state of the art, an improved turbocharged engine system and an improved method of charging and emission controlling a turbocharged engine system are provided. In particular, embodiments as described herein beneficially provide for improved efficiency with reduced $NO_x$ emissions at reduced system complexity and less costs. Additionally, the concept of the turbocharged engine system according to the present disclosure beneficially provides for the possibility to easily retrofit existing engine systems, namely by providing a constant Miller or Atkinson timing in combination with a control device-which can easily be external and added-on (for example during an upgrade procedure)—for controlling an electrical power converter coupled with a turbocharger as described herein. Further, the performance, e.g. the acceleration and the load pick-up ability, of the turbocharged engine system can even be improved due the electrical power converter coupled to the turbocharger.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Figure 1:
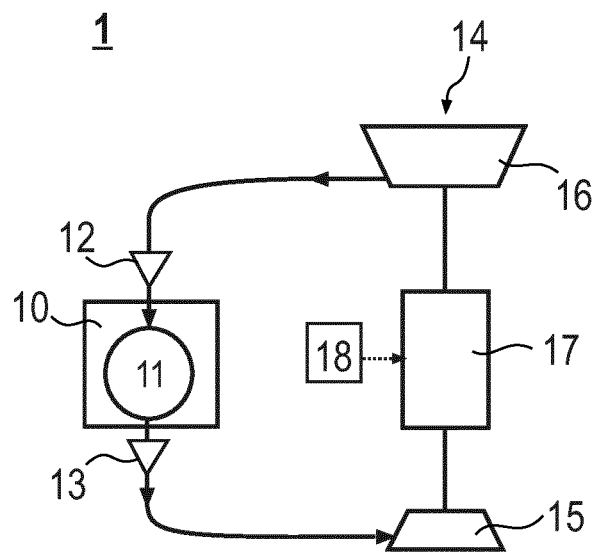
FIG. 1 shows a schematic view of a turbocharged engine system according to embodiments described herein.

With exemplary reference to FIG. 1, a turbocharged engine system 1 according to the present disclosure is described. According to embodiments, which can be combined with other embodiments described herein, the turbocharged engine system 1 includes a combustion engine 10 having at least one cylinder 11, at least one inlet valve 12 configured to supply the at least one cylinder 11 with intake air or air-fuel-mixture (i.e. an intake gas/intake gas mixture), and at least one outlet valve 13 configured to discharge exhaust from the at least one cylinder 11. It is to be understood, the intake gas/intake gas mixture may include at least one of air, fuel, recirculated exhaust gas, and water. The at least one inlet valve 12 is configured to provide a constant cyclical valve timing between an open state and a closed state of the at least one inlet valve. In particular, the expression "at least one inlet valve" can be understood as "at least one inlet valve system". The constant cyclical valve timing is a Miller timing or Atkinson timing. Additionally, the turbocharged engine system 1 includes at least one turbocharger 14 having a turbine 15 and a compressor 16 for pressurizing the intake air or air-fuel-mixture. Typically, the turbine 15 is configured for recovering enthalpy from the exhaust gases. Further, the turbocharged engine system 1 includes at least one electrical power converter 17 coupled with at least one of the compressor 16 and the turbine 15. Moreover, the turbocharged engine system 1 includes a control device 18 configured for controlling the at least one electrical power converter 17 to provide power to or to take off power from at least one of the compressor 16 and the turbine 15 to achieve a targeted value of at least one operational parameter of the combustion engine 10. The turbine 15 has an effective section $S_{res,T}$ being sized such that a generated power by the turbine 15 provides at least a power required by the compressor to reach the targeted value of the at least one operational parameter without using the at least one electrical power converter 17 as a motor during non-acceleration operation of the combustion engine 10.

Accordingly, compared to the prior art, an improved turbocharged engine system is provided. In particular, the turbocharged engine system as described herein beneficially provides for improved efficiency with reduced $NO_x$ emissions at reduced system complexity resulting in an overall coast reduction. Additionally, the concept of the turbocharged engine system as described herein beneficially provides for the possibility to easily retrofit existing engine systems, namely by providing a constant Miller or Atkinson timing in combination with a control device for controlling an electrical power converter coupled with a turbocharger as described herein. Further, embodiments of the turbocharged engine system as described herein beneficially provide for improved performance, particularly improved acceleration and improved load pick-up ability.

Before various further embodiments of the present disclosure are described in more detail, some aspects with respect to some terms used herein are explained.

In the present disclosure, "at least one cylinder" can be understood in that one or more cylinders may be provided. For example, the combustion engine as described herein may include a number Ne of cylinders, wherein $N_C$ can be selected from the range of $1 \leq N_C \leq 30$.

In the present disclosure, "at least one an inlet valve" can be understood in that one or more inlet valves may be provided. For example, the at least one cylinder as described herein may include a number $N_{IV}$ of inlet valves, wherein $N_{IV}$ can be selected from the range of $1 \leq N_{IV} \leq 4$.

In the present disclosure, "at least one outlet valve" can be understood in that one or more outlet valves may be provided. For example, the at least one cylinder as described herein may include a number $N_{OV}$ of outlet valves, wherein $NO_V$ can be selected from the range of $1 < N_{OV} \leq 4$.

In the present disclosure, "Miller timing" can be understood as a timing according to the Miller cycle. In the Miller cycle, the inlet valve(s) is(are) closed earlier within the cycle than it (they) would be in a conventional Diesel or Beau de Rochas/Otto-cycle engine. In effect, the intake process is shortened, and the volumetric efficiency is reduced, leading to a lower trapped air or fuel-air mixture mass in the cylinder (charge) for a given intake receiver air density. Typically, this loss of charge would result in a loss of power. However, in the Miller cycle, this can be compensated for by the use of a supercharger. The supercharger typically will need to be of the positive-displacement type due to its ability to produce enough boost already at relatively low engine speeds and/or load. Otherwise, the power at low engine speed and/or load the capability for load pick-up will suffer. In the Miller-cycle engine, when the piston is at its bottom-most position, at the beginning of the compression stroke, the cylinder pressure is lower than the intake receiver pressure. This means that the cylinder pressure will be at the same level as the receiver pressure only long enough after having moved upwards from its bottom most position. Thus, in the Miller cycle engine, the piston actually compresses the air or the fuel-air mixture only during the rest of the compression stroke, once the intake valve(s) is (arc) closed. The Miller valve timing can be defined as following: when at least one of the intake valve(s) is already closed 20 crank angle degrees before the piston bottom-most position, end of the intake stroke. The definition of closed valve can be "once the considered valve is at a lift equal or under 10% of its max lift". As example, if the max lift of a given intake valve is 26 mm, the valve is considered closed as soon as its lift is equal or under 2.6 mm.

In the present disclosure, "Atkinson timing" can be understood as timing according to the Atkinson cycle. In the Atkinson cycle the inlet valve is held open longer than normal, allowing a reverse flow of intake air or fuel-air mixture toward the intake manifold. The effective compression ratio is reduced—for the time the intake air or fuel-air mixture is escaping the cylinder freely rather than being compressed—but the expansion ratio is unchanged (i.e., the compression ratio is smaller than the expansion ratio). The Atkinson valve timing can be defined as following: when at least one of the intake valve(s) is still opened 20 crank angle degrees after the piston bottom-most position, end of the intake stroke. The definition of opened valve can be when the considered valve is at a lift superior or equal to 10% of its max lift. As example, if the max lift of a given intake valve is 41 mm, the valve is considered opened if its lift is superior or equal to 4.1 mm.

It is to be understood that originally, the goal of both Miller and Atkinson cycles was to have an expansion stroke longer than the compression stroke (or equivalent), leading to better cycle efficiency. Implicitly, and as already explained, especially through combustion maximal temperature reduction, these two cycles finally allow a better compromise [$NO_x$, efficiency] on supercharged or turbocharged engines.

In the present disclosure, "at least one turbocharger" can be understood in that one or more turbochargers may be provided. According to an example, a single turbocharger may provide a one-stage charging system, two turbochargers may provide a two-stage charging system, three turbochargers may provide a three-stage charging system etc. Accordingly, the turbocharged engine system may be provided with number $N_{TC}$ of turbochargers, wherein $N_{TC}$ can be selected from the range of $1 \leq N_{TC} \leq 4$. In case two or more turbochargers are provided, the two or more turbochargers can be arranged in parallel.

In the present disclosure, the expression "at least one electrical power converter coupled with at least one of the compressor and the turbine" can be understood in that one or more electrical power converters can be provided which can be coupled with the compressor and/or the turbine. For example, the at least one electrical power converter can be coupled to the shaft connecting the compressor and the turbine. Accordingly, the at least one electrical power converter may be arranged between the compressor and the turbine of the turbocharger. Such a configuration may also be referred to as e-turbo. Alternatively, the at least one electrical power converter may be only coupled to the compressor, e.g. via a shaft, which may also be referred to as e-compressor.

According to another example, the at least one electrical power converter may be only coupled to the turbine, e.g. via a shaft, which may also be referred to as e-turbine. Typically, the at least one electrical power converter is configured for converting electrical power into mechanical power and vice versa. In other words, the at least one electrical power converter can be understood as an electric device configured for recovering energy by converting mechanical power into electrical power, particularly by electrically braking down the turbine, when the turbine power is larger than the required compressor power, or providing mechanical power when the compressor requires more power than the turbine is able to provide, e.g. from or to the turbocharger, particularly from or to the compressor/turbine.

In the present disclosure, the expression "a control device configured for controlling the at least one electrical power converter" can be understood as an electronic device capable of controlling the at least one electrical power converter, e.g. by means of a control signal.

In the present disclosure, "at least one operational parameter of the combustion engine" can be understood as any parameter of the combustion engine during operation which allows for characterizing the operational state of the combustion engine.

According to embodiments, which can be combined with other embodiments described herein, the effective section $S_{res,T}$ is $S_{res}=(S_{Rt} \times S_{St})/(S_{Rt}^2+S_{St}^2)^{1/2}$, wherein $S_{St}$ is the throat area of a stator of the turbine in cm², particularly the throat area of a nozzle ring of the turbine in cm², and wherein $S_{R_t}$ is the throat area of a rotor of the turbine in cm². It is to be understood that the throat area of the stator is the minimum cross-sectional area in the stator. The throat area of the rotor is the minimum cross-sectional area in the rotor.

According to embodiments, which can be combined with other embodiments described herein, the power from the turbine that should be or is supplied to the compressor is determined by the formula:

$$P_{T,comp} = \dot{m}_{c,inlet} \cdot c_{p,mixture} \cdot T_{C,inlet} \cdot \left( \frac{\left(\frac{p_{c,outlet}}{p_{c,inlet}}\right)^{\frac{\kappa_{mixture}-1}{\kappa_{mixture}}} - 1}{\eta_C} \right) + P_{mech}(W)$$

$\dot{m}_{c,inlet}$: Mass flow at compressor inlet (kg·s⁻¹)
$C_{p,mixture}$: Specific heat capacity at constant pressure of mixture flowing through compressor (J·kg⁻¹·K⁻¹)
$T_{C,inlet}$: Total temperature at compressor inlet (K)
$P_{c,outlet}$: Total pressure at compressor outlet (bar)
$P_{c,inlet}$: Total pressure at compressor inlet (bar)
$K_{mixture}$: Heat capacity ratio of mixture flowing through compressor (specific to the mixture) (–)
$K_{air}$~1.4
$\eta_c$: Compressor isentropic efficiency (–)
$P_{mech}$: Mechanical losses (W)

According to embodiments, which can be combined with other embodiments described herein, the control device 18 is configured to compare an actual value of the at least one operational parameter with the targeted value of the at least one operational parameter. Further, the control device 18 is configured to control the at least one electrical power converter 17 when there is a deviation between the actual value and the targeted value. For instance, the actual value of the at least one operational parameter can be a measured value of the at least one operational parameter. According to another example, the actual value can be a calculated value from a measured value of the at least one operational parameter.

Figure 2:
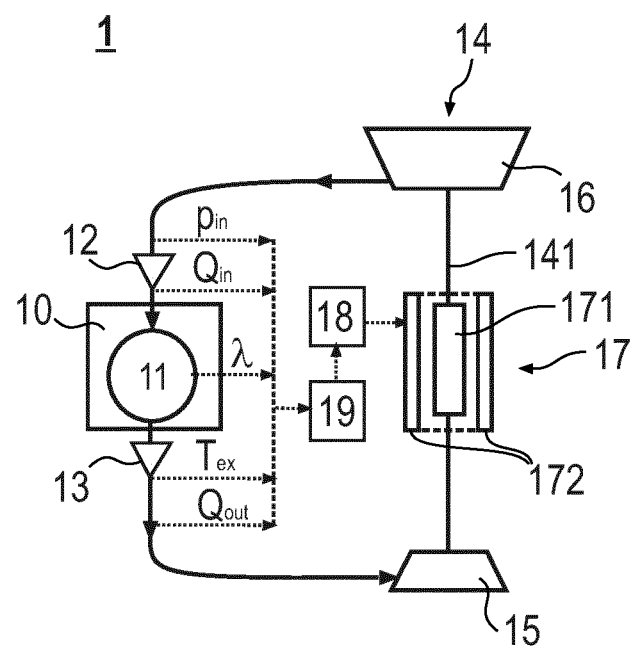
FIG. 2 shows a schematic view of a turbocharged engine system according to further embodiments described herein.
Figure 3:
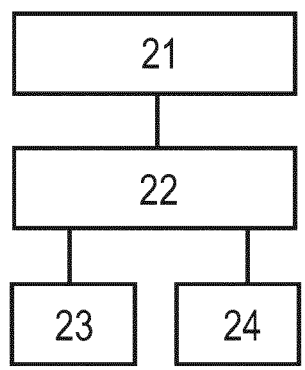
FIGS. 3 to 6 show block diagrams for illustrating embodiments of a method of charging and emission controlling a turbocharged engine system according to embodiments described herein.

With exemplary reference to FIG. 2, according to embodiments, which can be combined with other embodiments described herein, the turbocharged engine system 1 includes at least one sensor 19 to measure the at least one operational parameter. Typically, the at least one operational parameter is selected from the group including an air mass flow rate $Q_{in}$, an air fuel ratio $\lambda$, an intake pressure $p_{in}$, particularly an intake air pressure or an intake air-fuel-mixture pressure, an exhaust temperature $T_{ex}$, and a $NO_x$ emission rate $Q_{out}$. Accordingly, it is to be understood that one or more sensors may be provided configured for measuring the at least one operational parameter. For example, the at least one sensor 19 may include a flow-meter and/or a $\lambda$-sensor and/or a pressure sensor and/or a temperature sensor and/or a $NO_x$ sensor.

According to embodiments, which can be combined with other embodiments described herein, the at least one electrical power converter 17 is configured to be used as motor and/or generator. As exemplarily shown in FIG. 2, according to embodiments, which can be combined with other embodiments described herein, the electrical power converter 17 may include a rotor 171 and a stator 172. Typically, the rotor 171 is connected to a shaft 141 connecting the compressor 16 with the turbine 15.

With exemplary reference to FIGS. 3 to 6, embodiments of a method 20 of charging and emission controlling a turbocharged engine system 1 according to the present disclosure are described. The turbocharged engine system 1 includes a combustion engine 10 having at least one cylinder 11, at least one inlet valve 12 configured to supply the at least one cylinder 11 with intake air or fuel-air mixture, and at least one outlet valve 13 configured to discharge exhaust from the at least one cylinder 11. Further, the turbocharged engine system 1 includes at least one turbocharger 14 having a turbine 15 and a compressor 16 for pressurizing the intake air or fuel-air mixture. Additionally, the turbocharged engine system 1 includes at least one electrical power converter 17 coupled with at least one of the compressor 16 and the turbine 15. Moreover, the turbocharged engine system 1 includes a control device 18 configured for controlling the electrical power converter 17. The turbine 15 has an effective section $S_{res,T}$ being sized such that a generated power by the turbine 15 provides at least a power required by the compressor to reach a targeted value of the at least one operational parameter without using the at least one electrical power converter 17 as a motor during non-acceleration operation of the combustion engine 10. According to embodiments, which can be combined with any other embodiments described herein, the effective section $S_{res,T}$ is small enough, such that it is not required to have an electric power supply at low loads to reach the targeted value of the at least one operational parameter. This allows to run the engine in case of electrical failure of the at least one electrical power converter (recovery mode).

According to embodiments, which can be combined with other embodiments described herein, the method 20 includes providing (represented by block 21 in FIGS. 3 to 6) a constant cyclical valve timing between an open state and a closed state of the at least one inlet valve: The constant cyclical valve timing is a Miller timing or Atkinson timing. Further, the method includes controlling (represented by block 22 in FIGS. 3 to 6) the at least one electrical power converter 17 by the control device 18 for providing power (represented by block 23 in FIGS. 3 to 6) to at least one of the compressor 16 and the turbine 15 only during acceleration modes of the combustion engine 10. Additionally or alternatively, the method includes controlling (represented by block 22 in FIGS. 3 to 6) the at least one electrical power converter 17 by the control device 18 for taking power off (represented by block 24 in FIGS. 3 to 6) from at least one of the compressor 16 and the turbine 15 only during non-acceleration modes to achieve the targeted value of at least one operational parameter of the combustion engine 10. The at least one operational parameter can be an air mass flow rate $Q_{in}$, an air fuel ratio $\Delta$, an intake pressure $p_{in}$, particularly an intake air pressure or an intake air-fuel-mixture pressure, an exhaust temperature $T_{ex}$ and a $NO_x$ emission rate $Q_{out}$. Typically, providing power (represented by block 23 in FIGS. 3 to 6) to at least one of the compressor 16 and the turbine 15 includes converting electrical power into mechanical power. Accordingly, typically taking power off (represented by block 24 in FIGS. 3 to 6) from at least one of the compressor 16 and the turbine 15 includes converting mechanical power into electrical power.

In the present disclosure, acceleration mode can be understood as a mode at which engine power changes at constant or variable engine speed. In other words, an acceleration mode is a mode at which variation of engine power occurs in a given time slot. For example, in the case of a constant engine speed of 1500 rpm, a power increase from 80-100% in 5 seconds. Another example for an acceleration mode is in the case of a variable speed engine, a power increase from 20-40% in 1 minute.

In the present disclosure, non-acceleration mode can be understood as constant engine load and speed operation, i.e. no variation of engine load and speed in a given time slot. For example, in the case of a constant engine speed: of 1000 rpm, a constant engine load of 85% during 30 seconds. Another example for a non-acceleration mode is in the case of a variable speed engine, a constant engine load of 40% and speed during 4 hours.

Figure 4:
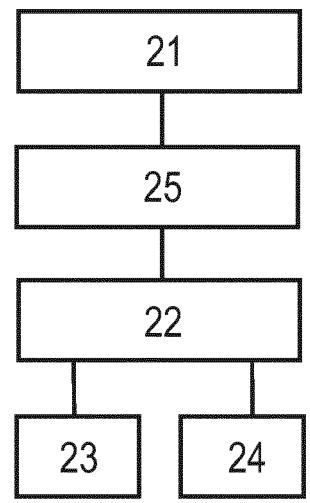
Figure 5:
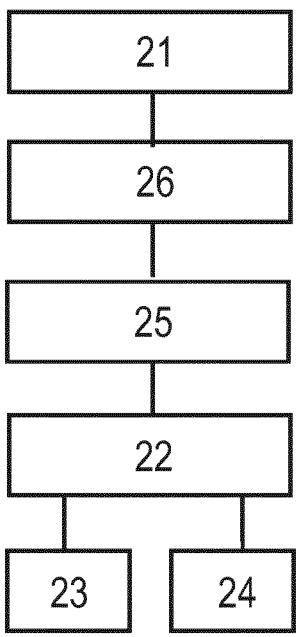
Figure 6:
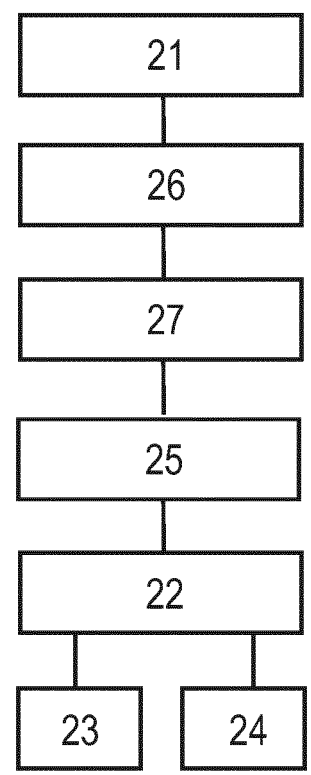

With exemplary reference to FIGS. 4 to 6, according to embodiments, which can be combined with other embodiments described herein, the method 20 further includes comparing (represented by block 25 in FIGS. 4 to 6) an actual value of the at least one operational parameter with the targeted value of the at least one operational parameter and controlling (represented by block 22 in FIGS. 4 to 6) the at least one electrical power converter 17 by the control device 18 when there is a deviation between the actual value and the targeted value. In particular, the at least one electrical power converter 17 may be controlled by the control device 18 to minimize the deviation between the actual value and the targeted value in order to achieve the targeted value of the at least one operational parameter of the combustion engine.

According to embodiments, which can be combined with other embodiments described herein, the actual value of the at least one operational parameter can be a measured value of the at least one operational parameter. Accordingly, with exemplary reference to FIGS. 5 and 6, the method 20 may include measuring (represented by block 26 in FIGS. 5 and 6) the actual value of the at least one operational parameter by a sensor 19.

According to another example, the actual value can be a calculated value which is calculated from a measured value of the at least one operational parameter. Accordingly, with exemplary reference to FIG. 6, the method 20 may include calculating (represented by block 27 in FIG. 6) the actual value of the at least one operational parameter from a measured value of the at least one operational parameter.

Accordingly, in view of the embodiments described herein, it is to be understood that the turbocharged engine system as well as the method of charging and emission controlling a turbocharged engine system are improved compared to the state of the art, particularly with respect to system efficiency and NOx emissions reduction while at the same time providing for a reduced system complexity and thus better costs efficiency. Further it is to be noted, that according to embodiments, which can be combined with any other embodiments described herein, the effective section Sres,T is small enough, such that it is not required to have an electric power supply at low loads to reach the targeted value of the at least one operational parameter. This allows to run the engine in case of electrical failure of the at least one electrical power converter (recovery mode).

While the foregoing is directed to embodiments, other and further embodiments may be devised without departing from the basic scope, and the scope is determined by the claims that follow.

REFERENCE NUMBERS 1 turbocharged engine system
10 combustion engine
11 cylinder
12 inlet valve
13 outlet valve
14 turbocharger
141 shaft
15 turbine
16 compressor
17 electrical power converter
171 rotor
172 stator
18 control device
19 sensor
20 method of charging and emission controlling a combustion engine
21, 22, 23, 24, 25, 26, 27 blocks of block diagrams for illustrating embodiments of the method of charging and emission controlling a combustion engine
$P_{in}$ intake pressure
$Q_{in}$ air mass flow rate
$Q_{out}$ $NO_x$ emission rate
$\lambda$ air fuel ratio
$T_{ex}$ exhaust temperature

The invention claimed is:

1. A turbocharged engine system, comprising:
a combustion engine having at least one cylinder;
at least one inlet valve configured to supply the at least one cylinder with intake air or air-fuel-mixture, the at least one inlet valve being configured to provide a constant cyclical valve timing between an open state and a closed state of the at least one inlet valve, the constant cyclical valve timing being a Miller timing or Atkinson timing;
at least one outlet valve configured to discharge exhaust from the at least one cylinder;
at least one turbocharger having a turbine and a compressor for pressurizing the intake air or air-fuel-mixture;
at least one electrical power converter coupled with at least one of the compressor and the turbine; and
a control device configured for controlling the at least one electrical power converter to provide power to or to take off power from at least one of the compressor and the turbine to achieve a targeted value of at least one operational parameter of the combustion engine, wherein the turbine has an effective section $S_{res,T}$ being sized such that a generated power by the turbine provides at least a power required by the compressor to reach the targeted value of the at least one operational parameter without using the at least one electrical power converter as a motor during non-acceleration operation of the combustion engine.

2. The turbocharged engine system of claim 1, wherein the control device is configured to compare an actual value of the at least one operational parameter with the targeted value of the at least one operational parameter, and wherein the control device controls the at least one electrical power converter when there is a deviation between the actual value and the targeted value.

3. The turbocharged engine system of claim 2, wherein the actual value of the at least one operational parameter is a measured value of the at least one operational parameter, or wherein the actual value is a calculated value from a measured value of the at least one operational parameter.

4. The turbocharged engine system of claim 1, further comprising at least one sensor to measure the at least one operational parameter.

5. The turbocharged engine system of claim 1, wherein the at least one operational parameter is selected from the group comprising an air mass flow rate $Q_{in}$, an air fuel ratio $\lambda$, an intake pressure $p_{in}$, an exhaust temperature $T_{ex}$, and a $NO_x$ emission rate $Q_{out}$.

6. The turbocharged engine system of claim 5, wherein the intake pressure $p_{in}$ is an intake air pressure or intake air-fuel mixture pressure.

7. The turbocharged engine system of claim 1, wherein the at least one electrical power converter is configured to be used as at least one of motor during acceleration modes of the combustion engine and/or as generator only during non-acceleration modes.

8. The turbocharged engine system of claim 1, wherein the effective section $S_{res,T}$ is $S_{res}=(S_{Rt} \times S_{St})/(S_{Rt}^2+S_{St}^2)^{1/2}$, wherein $S_{St}$ is the throat area of a stator of the turbine in cm$^2$, and wherein $S_{Rt}$ is the throat area of a rotor of the turbine in cm$^2$.

9. The turbocharged engine system of claim 8, wherein $S_{St}$ is the throat area of a nozzle ring of the turbine in cm$^2$.

10. A method of charging and emission controlling a turbocharged engine system (1), the turbocharged engine system comprising:
a combustion engine having at least one cylinder;
at least one inlet valve configured to supply the at least one cylinder with intake air or air-fuel-mixture;
at least one outlet valve configured to discharge exhaust from the at least one cylinder;
at least one turbocharger having a turbine and a compressor for pressurizing the intake air or air-fuel-mixture;
at least one electrical power converter coupled with at least one of the compressor and the turbine; and
a control device configured for controlling the electrical power converter, wherein the turbine has an effective section $S_{res,T}$ being sized such that a generated power by the turbine provides at least a power required by the compressor to reach a targeted value of the at least one operational parameter without using the at least one electrical power converter as a motor during non-acceleration operation of the combustion engine,
wherein the method comprises:
providing a constant cyclical valve timing between an open state and a closed state of the at least one inlet valve, the constant cyclical valve timing being a Miller timing or Atkinson timing; and
controlling the at least one electrical power converter by the control device for providing power to at least one of the compressor and the turbine only during at least one of acceleration modes of the combustion engine and/or taking power off from at least one of the compressor and the turbine only during non-acceleration modes to achieve the targeted value of at least one operational parameter of the combustion engine.

11. The method of claim 10, further comprising comparing an actual value of the at least one operational parameter with the targeted value of the at least one operational parameter, and controlling the at least one electrical power converter by the control device when there is a deviation between the actual value and the targeted value.

12. The method of claim 11, wherein the actual value of the at least one operational parameter is a measured value of the at least one operational parameter, or wherein the actual value is a calculated value from a measured value of the at least one operational parameter.

13. The method of claim 11, further comprising measuring the actual value of the at least one operational parameter by a sensor.

14. The method of claim 11, further comprising calculating the actual value of the at least one operational parameter from a measured value of the at least one operational parameter.

15. The method of claim 11, wherein the at least one operational parameter is selected from the group comprising an air mass flow rate $Q_{in}$, an air fuel ratio $\lambda$, an intake pressure $p_{in}$, an exhaust temperature $T_{ex}$ and a NO$_x$ emission rate $Q_{out}$.

16. The method of claim 15, wherein the intake pressure $p_{in}$ is an intake air pressure or intake air-fuel mixture pressure.

17. The method of claim 11, wherein providing power to at least one of the compressor and the turbine comprises converting electrical power into mechanical power.

18. The method of claim 11, wherein taking power off from at least one of the compressor and the turbine comprises converting mechanical power into electrical power.

* * * * *